Patented Nov. 27, 1945

2,389,801

UNITED STATES PATENT OFFICE 2,389,801

MANUFACTURE OF STYRENE

William J. Mattox, Riverside, Ill., assignor to Universal Oil Products Company, Chicago, Ill., a corporation of Delaware No Drawing. Application December 10, 1942, Serial No. 468,559

10 Claims. (Cl. 260—669)

This invention is concerned with a catalytic process for the production of styrene wherein either ethyl cyclohexane or hydrocarbon fractions containing substantial amounts of this hydrocarbon are processed.

The hydrocarbon styrene, also known as cinnamene, is phenyl ethylene and is used as a base material for the manufacture of various materials of the nature of resins, plastics and elastomers by virtue of its ability to polymerize with itself or with other compounds. For example, high molecular weight products produced by copolymerizing styrene with butadiene constitute the so-called "Buna-S" rubber, and other high molecular weight products are made by the copolymerization of styrene with such substances as isoprene, acrylonitrile, chloroprene, etc. Styrene is recovered in limited quantities from coal tar and can be produced by the dehydrogenation of ethyl benzene which in turn may be made by the alkylation of benzene with ethylene. A source of styrene which has not been extensively exploited consists of certain aromatic fractions of cracked gasolines, particularly those which have been produced by the so-called "hydroforming" processes in which gasolines of a straight-run character are processed in the presence of hydrogen while in contact with various types of catalysts under conversion conditions. One difficulty in utilizing such fractions for the production of styrene is due to the fact that the 8-carbon atom aromatics comprise not only ethyl benzene but the various xylenes, particularly meta- and para-xylenes which boil so close to ethyl benzene that their separation from this hydrocarbon by fractional distillation is impractical. For purposes of reference, the boiling points of the principal C8 aromatic hydrocarbons are given below:

| Compound | Boiling point, °C. |
|---|---|
| Ethyl benzene | 136.5 |
| Ortho-xylene | 144 |
| Meta-xylene | 139 |
| Para-xylene | 138 |

When these 8-carbon atom aromatics are hydrogenated to the corresponding cyclohexane compounds, the boiling points are changed in the direction of a wider range between the meta- and para-dimethyl compound and the ethyl derivative so that separation is more readily effected and a fraction of ethyl cyclohexane is obtainable which is amenable to treatment by the present process. Thus, the boiling points of the alkyl cyclohexanes corresponding to the 8-carbon atom aromatics given in the preceding table are given below:

| Compound | Boiling point, °C. |
|---|---|
| Ethyl cyclohexane | 132 |
| 1, 2-dimethyl cyclohexanes | ¹ 122–130 |
| 1, 3-dimethyl cyclohexane | 120 |
| 1, 4-dimethyl cyclohexane | 120.5 |

¹ Various figures reported for both cis and trans isomers.

In one specific embodiment the present invention comprises a process for the production of styrene which consists in subjecting ethyl cyclohexane to contact with catalysts comprising essentially oxides of the elements in the left hand columns of groups IV, V, and VI of the periodic table at temperature, pressure and space velocities adequate to produce substantial yields of said styrene.

Catalysts which are utilizable in producing styrene by the present process include the oxides of titanium, zirconium, cerium, hafnium, and thorium in the left hand column of group IV; vanadium, columbium and tantalum in the left hand column of group V; and chromium, molybdenum, tungsten, and uranium in the left hand column of group VI. While these oxides may be used alternatively, they do not give precisely equivalent results under a given set of operating conditions. Oxides of chromium, molybdenum and vanadium are the best of those mentioned and these oxides may be used as such or deposited upon relatively inert refractory spacing materials such as, for example, various types of aluminas, both naturally occurring and prepared clay minerals, prepared composites of the silica-alumina type, or materials of an essentially siliceous character such as kieselguhr. Catalyst composites may be made by various methods involving, for example, mixing of decomposible salts of the elements mentioned with refractory carriers and heating to remove volatilizable radicals and develop the catalytically active oxides; precipitating hydrated oxides upon refractory materials suspended in solutions of salts by the addition of basic precipitants such as, for example, ammonium hydroxide and heating to effect dehydration. Many other alternative methods of preparing catalytically active composites of the present character are known and it is comprised within the scope of the invention to utilize any composite of one or more of the IV, V and VI group oxides mentioned prepared by any suitable method in accelerating the overall dehydrogenating reactions which characterize the present process.

The conversion of the ethyl cyclohexane to styrene is preferably conducted in a continuous manner, for example, by passing the ethyl cyclohexane or a hydrocarbon fraction containing a substantial proportion thereof over a stationary bed of granular catalyst followed by the separation of the styrene and the recycling of unconverted or partially converted products to further dehydrogenation treatment. When using the more active catalysts comprising such oxides as those of chromium, molybdenum and vanadium, temperatures of from about 450 to about 700° C. may be used, pressures below atmospheric and hourly liquid space velocities of from about 0.2 to about 5.0. Instead of using subatmospheric pressure, diluent gases or vapors may be employed at higher pressures in admixture with ethyl cyclohexane, to obtain partial pressure effects such gases including, for example, hydrogen, nitrogen, methane, steam and benzene. Exact conditions employed will depend upon whether substantially pure ethyl cyclohexane is charged or whether the charging material consists of this hydrocarbon in admixture with minor amounts of other hydrocarbons.

Instead of using the preferred catalysts in granular form in stationary beds, they may be used in the so-called "fluid" types of operation wherein relatively large amounts of powdered catalyst are carried along in the stream of hydrocarbons undergoing reaction and later separated and reactivated or wherein the hydrocarbon reactants pass through a reactor containing a powdered catalyst maintained in internal circulation by the stream of reactants without substantial catalyst carry-over.

The preferred catalysts, when used within the ranges of operating conditions specified, have been found to be selective in producing good yields of styrene without the formation of undesirable decomposition products which are not capable of recycling to increase the ultimate yield of styrene. Thus, the recycle material in continuous operation may consist of about 3 parts of unconverted ethyl cyclohexane boiling at 132° C. to 1 part of ethyl benzene boiling at 136.5° C., as will be shown in a subsequent example. These recycle materials are readily separated by fractional distillation from the styrene which boils at 146° C.

In processing hydrocarbon fractions obtained from reformed naphthas such as those produced by the hydroforming process, a convenient method of operation is to separate a fraction boiling from about 125 to about 145° C., which will contain substantially all of the ethyl benzene and xylenes. Such a fraction may then be further separated into an overhead fraction comprising ethyl benzene (boiling point at 136.5° C.), meta-xylene (boiling point at 139° C.), and para-xylene (boiling point at 138° C.), any ortho-xylene (boiling point at 144° C.) being left in the higher boiling residual fraction. Alternatively, a hydrocarbon fraction containing the 8-carbon atom aromatics may be concentrated in respect to its aromatic content by solvent extraction of the aromatics with specific solvents such as, for example, liquid sulfur dioxide, furfural, etc. The extracted aromatics may then be fractionated and the fraction containing ethyl benzene and meta- and para-xylenes hydrogenated, and the ethyl cyclohexane separated for processing.

The separated dimethyl cyclohexanes may be cracked to produce butadiene which can be polymerized with the styrene to produce the so-called "Buna-S" rubber.

The following example is given to indicate the type of results obtainable in the operation of the process although it is not intended to unduly limit the scope of the invention in exact correspondence with the data given.

Vapors of ethyl cyclohexane were passed over a granular composite catalyst consisting of 86 per cent by weight of a commercial activated alumina, 12 per cent by weight of chromium oxides (expressed as sesquioxide), and 2 per cent by weight of magnesium oxide, the catalyst being used in the form of ⅛" x ⅛" cylindrical pills. The catalyst was maintained at a temperature of 600° C., a pressure of 80 millimeters absolute was maintained at the exit of the reaction tube and the ethyl cyclohexane was passed into the reaction zone at a rate corresponding to 1.5 volumes of liquid hydrocarbon per volume of catalyst space per hour. The once-through yields of products on a weight basis are given below:

| Product | Weight percent yield |
| --- | --- |
| Gas, principally hydrogen | 3.76 |
| Ethyl cyclohexane (unconverted) | 62 |
| Ethyl benzene | 21.2 |
| Styrene | 11.8 |
| Higher boiling hydrocarbons | 0.62 |
| Carbonaceous deposits | 0.62 |

By recycling the unconverted ethyl cyclohexane and the ethyl benzene an ultimate yield of 82 per cent styrene was obtained.

I claim as my invention:

1. A process which comprises forming styrene directly from ethyl cyclohexane by dehydrogenating the latter under a pressure below atmospheric in the presence of a dehydrogenating catalyst at a temperature of from about 450° C. to about 700° C. and an hourly liquid space velocity of from about 0.2 to about 5.0.

2. A process which comprises forming styrene directly from ethyl cyclohexane by dehydrogenating the latter under a pressure below atmospheric in the presence of a metal oxide dehydrogenating catalyst at a temperature of from about 450° C. to about 700° C. and an hourly liquid space velocity of from about 0.2 to about 5.0.

3. The process of claim 2 further characterized in that said catalyst comprises an oxide of chromium.

4. The process of claim 2 further characterized in that said catalyst comprises an oxide of molybdenum.

5. The process of claim 2 further characterized in that said catalyst comprises an oxide of vanadium.

6. A process for producing styrene from ethyl cyclohexane which comprises passing vapors of ethyl cyclohexane over a dehydrogenating catalyst at a temperature of about 600° C., a pressure of about 80 millimeters absolute and a rate corresponding to about 1.5 volumes of liquid hydrocarbon per volume of catalyst space per hour.

7. The process as defined in claim 6 further characterized in that said catalyst comprises an oxide of an element from the left hand column of group VI of the periodic table.

8. A process for producing styrene from ethyl cyclohexane which comprises passing vapors of ethyl cyclohexane over a dehydrogenating catalyst comprising an oxide of chromium at a temperature of about 600° C., a pressure of about 80 millimeters absolute and a rate corresponding to about 1.5 volumes of liquid hydrocarbon per volume of catalyst space per hour.

9. A process for producing styrene from ethyl cyclohexane which comprises passing vapors of ethyl cyclohexane over a dehydrogenating catalyst comprising alumina and an oxide of chromium at a temperature of about 600° C., a pressure of about 80 millimeters absolute and a rate corresponding to about 1.5 volumes of liquid hydrocarbon per volume of catalyst space per hour.

10. A process which comprises forming styrene directly from ethyl cyclohexane by dehydrogenating the latter in contact with a dehydrogenating catalyst and in the presence of a gaseous diluent at a temperature of from about 450° C. to about 700° C., an hourly liquid space velocity of from about 0.2 to about 5.0 and a partial pressure of said ethyl cyclohexane below atmospheric.

WILLIAM J. MATTOX.